W. LEWIS.
ROTARY CUTTER.
APPLICATION FILED FEB. 6, 1909.
1,148,597.
Patented Aug. 3, 1915.
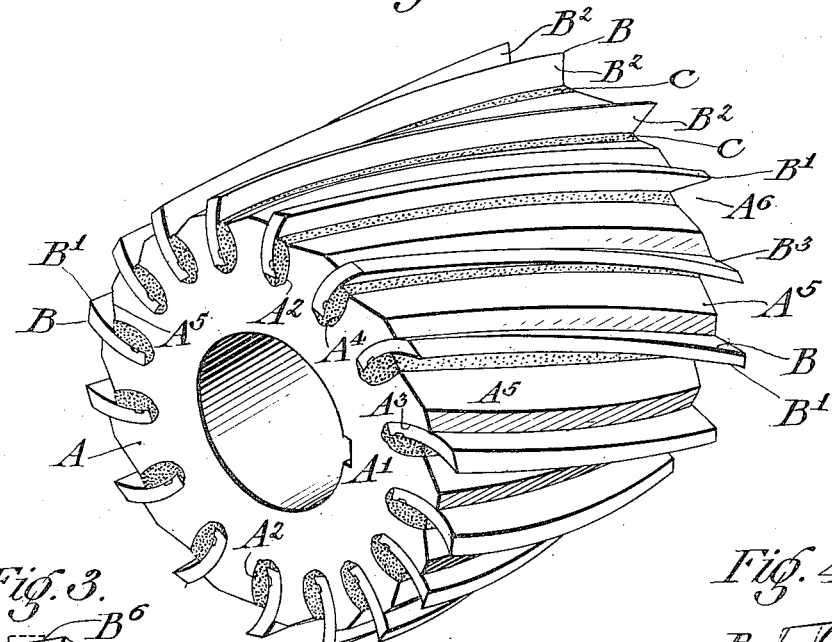
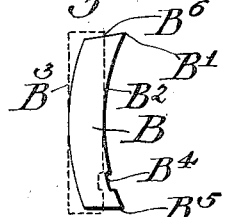
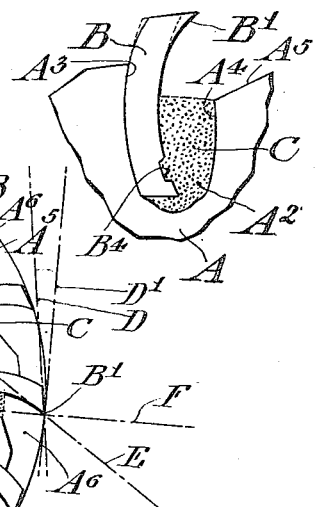
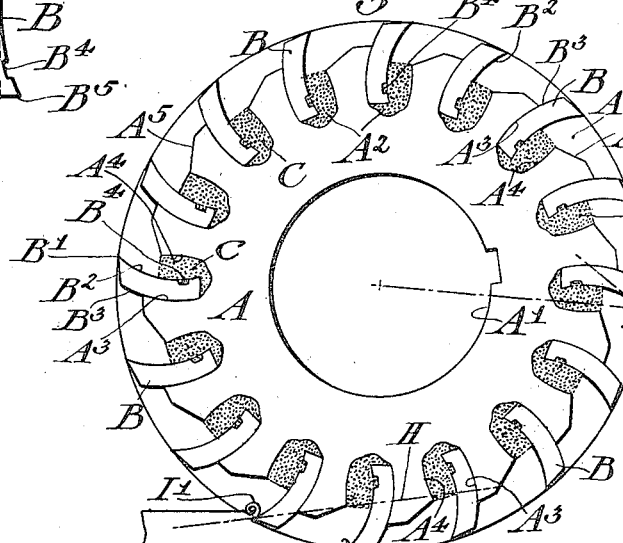
WITNESSES:
INVENTOR
Wilfred Lewis
BY
ATTORNEY.

UNITED STATES PATENT OFFICE.

WILFRED LEWIS, OF PHILADELPHIA, PENNSYLVANIA.

ROTARY CUTTER.

1,148,597. Specification of Letters Patent. Patented Aug. 3, 1915.

Application filed February 6, 1909. Serial No. 476,384.

*To all whom it may concern:*

Be it known that I, WILFRED LEWIS, a citizen of the United States of America, residing in the city and county of Philadelphia, in the State of Pennsylvania, have invented a certain new and useful Improvement in Rotary Cutters, of which the following is a true and exact description, reference being had to the accompanying drawings, which form a part thereof.

The present invention relates to rotary cutter tools, and particularly to tools such as the milling cutters used for metal cutting, of the kind in which the cutting blades are secured to, but are not integral with, the cutting head or tool holder proper.

The main object of the present invention is the provision of a cutter construction in which the cutting blades are formed and secured to the cutter head in such manner as to insure satisfactory and efficient operation, while at the same time insuring the proper mechanical strength to enable the cutter to stand up under severe operating conditions.

A further object of the invention is the provision of a cutter construction of the kind described, characterized by its mechanical strength, simplicity, and the relatively low cost of constructing and assembling the parts of the cutter and by the relatively small amount of material used in the cutter blades. The latter point is one of considerable importance when the blades are formed of the relatively expensive high speed steel and the tool shown is primarily intended for use with cutting blades of such material and is one devised to stand up under the severe operating conditions met with when the full cutting effectiveness of high speed steel cutting blades is utilized.

The invention consists in part of a cutter blade of peculiar shape, and in part of a cutter construction in which novel provisions are made for securing the blades in place and for supporting the blades.

The various features of novelty characterizing the invention are pointed out with particularity in the claims annexed to and forming a part of this specification. For a better understanding of the invention, however, and the advantages possessed by it, reference may be had to the accompanying drawings and descriptive matter, in which I have illustrated and described forms in which the invention may be embodied.

Of the drawings: Figure 1 is a perspective view of a milling cutter made in accordance with the invention; Fig. 2 is an end elevation of the same; Fig. 3 is a section on a larger scale than Fig. 2 of one of the cutter blades, with the cross-section of the bar from which it may be formed by a simple shaping operation shown in dotted outline; and Fig. 4 is an end elevation of a modified cutter blade.

In the drawings, A represents the cutter head formed with a central passage $A'$ to receive the arbor or mandrel for rotating the tool and with a series of helical slots $A^2$ in its periphery. As shown in the drawings, the slots $A^2$ are so undercut that each side wall of each slot is concave in cross-section transverse to the axis of the blank. By preference, also, the side walls $A^3$ are extended beyond the side walls $A^4$, the adjacent side walls $A^3$ and $A^4$ of adjacent slots being connected by a surface $A^5$ which is inclined inwardly adjacent the wall $A^4$. By this arrangement, the back of each inserted blade B is supported well out toward its cutting edge by the wall $A^3$, while a clearance space $A^6$ is formed in front of the cutting edge $B'$ of the tool.

The blades B, which are inserted in the slots $A^2$, are in the form of helical bars, the cutting edge $B'$ being one of the helical corner edges of the bar. The bars are also concavo-convex in cross-section transverse to the cutting edge, the concave side $B^2$ of the bar running from the cutting edge $B'$ of the tool, and the convex back side $B^3$ being arranged to bear against the seat for it, formed by the slot wall $A^3$. Each bar B may be secured in place in its slot $A^2$ in any suitable manner, but the construction disclosed was primarily designed for the use with the securing means shown, namely, a filling C of soft metal, such as type metal, which is run into place while melted, and after being run into place, may be tamped to compact it, the soft metal filling extending between the concave surface of the blade and the adjacent side wall $A^4$ and between the bottom wall of the slot and the bottom of the cutting blade. A groove, such as the groove $B^4$, may sometimes be employed with advantage in the concave face $B^2$ of each blade to be filled by the soft metal filling C and thereby assist in anchoring the filling and the blade in place.

The blade B may be given its peculiar configuration in any suitable way. I prefer, however, to form the blade out of a bar rectangular in cross-section, as indicated by the dotted outline in Fig. 3, by bending the bar in a direction transverse to the length of the blank to give it the concavo-convex form. The blank may be twisted into the helical form of the completed blade at the same time the transverse curvature is given to the blade, or the two shaping operations may be carried out independently. By forming each blade in the manner described and by securing the blades in the cutter head slot as described, I obtain in a simple manner a cutter possessing many desirable properties. To begin with, the concavo-convex form of each blade assists materially in obtaining the desired clearance angle. This angle, illustrated at the right hand side of Fig. 2, is an angle between the line $D'$, tangent to the line of travel of a point in the cutting edge $B'$, and the intersecting line $D$ lying in the plane of the outer side $B^6$ of the blade and lying also in a plane transverse to the axis of the cutter. If the blade formed is held in the cutter head as shown in Fig. 2, the clearance angle obtained by the transverse curvature of a bar rectangular in cross-section is sufficient, although each point in the cutting edge $B'$ is in front of the radial line drawn to the point in the inner edge $B^5$ of the blade which lies in the same plane transverse to the axis of the cutter as does the point in the cutting edge. This throwing of the cutting edge $B'$ in advance of the edge $B^5$ of the blade, coupled with the concaved form of the front side $B^2$ of the blade, gives the necessary lip angle. The lip angle referred to is the angle between the lines $E$ and $F$ shown at the right hand side of Fig. 2, which lie in the same plane transverse to the axis of the blank and intersect in the cutting edge $B'$ of the blade, the line $E$ being tangent to the curve $B^2$ and the line $F$ a radial line.

The transverse curvature of the blade and the throwing of the cutting edge of the blade in advance of the body of the blade also are each of advantage in obtaining the proper support for the blade, while at the same time permitting the supporting wall $A^3$ for the back of the blade to terminate at a distance from the axis of the tool appreciably less than the initial distance from the axis of the tool to the cutting edge $B'$, thus allowing for a considerable grinding away of the blades before their replacement becomes necessary. To understand how this advantage is obtained, it should be remembered that in a cutter of this character the resultant line of pressure exerted on the blade in a cutting operation does not extend tangentially to the line of movement of the cutting edge in the work, but is inclined thereto.

At the lower side of Fig. 2, the line $H$ indicates the approximate resultant line of pressure exerted by the work $I$ on the blade cutting the chip $I'$. That the line $H$ is placed with approximate accuracy will be appreciated by those familiar with the elaborate experiments made in recent years to determine the stresses exerted on the cutting blade by the work cut. It will be observed that this line does not intersect the front face of the blade at the cutting edge, but at a distance slightly nearer to the axis of the tool. It will also be observed that this line intersects the back wall $A^3$ of the slot in which the blade cutting the chip $I'$ is located. From this last fact it follows that the blade is supported about as well by a wall $A^3$ terminating where it does, as the blade would be supported if the wall $A^3$ were extended to the outer edge of the side $B^3$ of the tool.

Instead of making the curves $B^2$ and $B^3$ practically uniform from their inner and their outer edges, as shown in Figs. 1, 2 and 3, the outer portion of the blade may be bent forward more than the inner portion, as shown in Fig. 4. The effect of this increase in curvature given to the outer portion of the blade is to increase the clearance and lip angles obtained by bending the blade throughout its length. Obviously, the form given to a particular blade may vary with the conditions under which the blade is to be used.

As a consequence of the efficient manner in which the blades are supported in the cutter holder, these blades may be made relatively light with a consequent decrease in the cost of the tool where the blades are made of the relatively expensive high speed steel, and it may be remarked that the cutter construction claimed was particularly devised to permit of an economy in the use of high speed steel in a cutter possessing sufficient strength and durability to permit the full cutting capacity of the high speed steel blades to be utilized. The tool shown being provided with helical cutting edges with the proper clearance angles, for chips, with the proper lip angles, and with the proper support for the cutter blade, operates satisfactorily, efficiently and with a minimum of chattering. I may remark that the invention has been successfully utilized in a milling cutter larger and capable of removing metal faster than any milling cutter previously used, so far as I am aware, and I have had an extensive experience for many years with tools of this character.

An advantage had from using means as the soft metal fillings $C$ for securing the blades in place is that the insertion of these fillings and their removal may be accomplished by cutting them out or melting them out without injuring the walls of the slots $A^2$, so that after a blade has been removed another blade can be quickly and easily inserted in place.

The slots A² may be formed in the tool A in any suitable manner. By preference, I cut the slots by use of a rotary saw which is held in a certain relation to the blank while being moved relatively thereto through a helical path around the axis of the blank; but I will not herein describe the method of forming the slots, as such method forms the subject matter of my copending application Serial Number 476,383 filed of even date herewith.

While the particular slot configuration and cutter blade configuration disclosed herein are the best now known to me, it will be apparent to those skilled in the art that certain changes may be made in form and proportion of the parts without departing from the spirit of my invention. It will also be apparent that certain features of the invention claimed herein may be used with advantage under certain circumstances without a corresponding use of other features; but I do not wish the claims hereinafter made to be limited to the particular embodiments disclosed more than is made necessary by the state of the art.

Having now described my invention, what I claim as new and desire to secure by Letters Patent is:

1. As a new article of manufacture, a cutter blade adapted to be secured to a rotary metal cutting cutter head and in the form of a helical bar, one helical corner of which serves as a cutting edge, said bar being concavo-convex in cross-section transverse to the cutting edge, with the concaved side running from the cutting edge.

2. A metal cutting rotary cutter, comprising in combination a cylindrical cutter holder having helical slots formed in its periphery, the side walls of each slot being concave, cutter blades inserted one in each slot, each blade being in the form of a helical bar, one helical corner of which serves as a cutting edge, and each bar being concavo-convex in cross-section transverse to the cutting edge with the concave side running from the cutting edge, and soft metal fillings anchoring the blades in place in their slot.

3. A metal cutting rotary cutter comprising in combination, a cylindrical cutter holder having helical undercut slots formed in its periphery, the back walls of said slots being concave, cutter blades mounted in said slots and each in the form of a helical bar, one helical corner of which serves as a cutting edge, said bar being concavo-convex in cross section transverse to the cutting edge, with its concave side running from the cutting edge and its convex side fitting against the concave back side of the slot in which the blade is mounted, and means extending between the concave side of the cutter and the front wall of the slot for anchoring each blade in place.

WILFRED LEWIS.

Witnesses:
 ARNOLD KATZ,
 D. STEWART.